US012665402B2

(12) United States Patent
Isshiki et al.

(10) Patent No.:  US 12,665,402 B2
(45) Date of Patent:  Jun. 23, 2026

(54) ELECTRICAL JUNCTION BOX

(71) Applicant: Sumitomo Wiring Systems, Ltd., Yokkaichi (JP)

(72) Inventors: Maiko Isshiki, Yokkaichi (JP); Takumi Ejima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 10 days.

(21) Appl. No.: 18/836,513

(22) PCT Filed: Jan. 20, 2023

(86) PCT No.: PCT/JP2023/001688
§ 371 (c)(1),
(2) Date: Aug. 7, 2024

(87) PCT Pub. No.: WO2023/153171
PCT Pub. Date: Aug. 17, 2023

(65) Prior Publication Data
US 2025/0118951 A1     Apr. 10, 2025

(30) Foreign Application Priority Data

Feb. 10, 2022     (JP) ................................. 2022-019782

(51) Int. Cl.
*B60R 16/023*         (2006.01)
*H02G 3/03*           (2006.01)
*H02G 3/08*           (2006.01)
*B60R 16/03*          (2006.01)
(52) U.S. Cl.
CPC .......... *H02G 3/03* (2013.01); *B60R 16/0239* (2013.01); *H02G 3/081* (2013.01); *B60R 16/03* (2013.01)

(58) Field of Classification Search
CPC ................................................. B60R 16/0239
See application file for complete search history.

(56) References Cited

U.S. PATENT DOCUMENTS

| | | | | | |
|---|---|---|---|---|---|
| 2007/0217161 | A1* | 9/2007 | Wu | ..................... | H01L 23/3737 257/E23.083 |
| 2012/0057318 | A1* | 3/2012 | Oota | .................. | H05K 7/20854 361/753 |
| 2014/0335385 | A1* | 11/2014 | Ikeya | .................. | H01M 50/358 429/121 |
| 2016/0353563 | A1* | 12/2016 | Morimoto | ............ | H05K 5/0026 |
| 2019/0318892 | A1 | 10/2019 | Ikejiri et al. | | |

FOREIGN PATENT DOCUMENTS

| | | |
|---|---|---|
| JP | 2014-079093 A | 5/2014 |
| JP | 2021-086869 A | 6/2021 |

OTHER PUBLICATIONS

International Search Report, Application No. PCT/JP2023/001688, mailed Mar. 20, 2023. ISA/Japan Patent Office.

\* cited by examiner

*Primary Examiner* — Hung V Ngo
(74) *Attorney, Agent, or Firm* — Brooks Kushman P.C.

(57) ABSTRACT

An electrical junction box includes a housing constituted by an upper case and a lower case that have different linear expansion coefficients from each other, a busbar fixed to the upper case being in contact with a gap filler adhered to an inner surface of the lower case, and the electrical junction box includes a plurality of connection members that are provided in a vicinity of the gap filler and connect an inner surface of the lower case and an inner surface of the upper case that faces the inner surface.

8 Claims, 5 Drawing Sheets

ELECTRICAL JUNCTION BOX

CROSS-REFERENCE TO RELATED APPLICATIONS

This application is the U.S. national stage of PCT/JP2023/001688 filed on Jan. 20, 2023, which claims priority of Japanese Patent Application No. JP 2022-019782 filed on Feb. 10, 2022, the contents of which are incorporated herein.

TECHNICAL FIELD

The present disclosure relates to an electrical junction box that accommodates circuit components.

BACKGROUND

Conventionally an electrical junction box in which circuit components such as a relay are accommodated is mounted in a vehicle.

JP 2014-79093A discloses a power supply device that includes a relay having an openable/closable contact and an exciting coil that switches opening/closing of the contact, and that electrically connects the contact of the relay to a busbar. The busbar is provided with a heat dissipation mechanism, and thus the busbar can be used as both a current path and a heat dissipation path.

Meanwhile, circuit components such as relays generate a lot of heat during operation, and thus heat needs to be dissipated. Examples of heat dissipation methods include a method in which heat generated by circuit components is transmitted via a busbar to an accommodation housing that accommodates these circuit components, and heat is dissipated through the accommodation housing. In the case of such a method, an accommodation housing made of a heat dissipation resin having higher thermal conductivity than an ordinary resin is used in order to enhance the heat dissipation effect, and a so-called gap filler is interposed between the busbar and the accommodation housing in order to increase thermal conductivity between the busbar and the accommodation housing.

However, if such an accommodation housing is constituted by two portions having different linear expansion coefficients from each other and the busbar is fixed to one of the two portions, when the accommodation housing expands due to heat generated by a circuit component, the fixed busbar also expands due to expansion of the one portion. In contrast, the gap filler adhered to the other portion expands in response to the expansion of the other portion. That is, the difference between linear expansion coefficients of the two portions of the accommodation housing appears as a difference between the amounts of thermal expansion of the busbar fixed to the one portion and the gap filler adhered to the other portion, and the busbar is thus separated from the gap filler, causing a problem in that heat of a circuit component is not properly dissipated.

The power supply device disclosed in JP 2014-79093A is not devised to address such a problem, and such a problem cannot be solved.

The present disclosure was made to resolve the above-described issues, and aims to provide an electrical junction box that includes an accommodation housing constituted by two portions having different linear expansion coefficients from each other and can appropriately dissipate heat generated from circuit components during operation.

SUMMARY

An electrical junction box according to an embodiment of the present disclosure is an electrical junction box including:

a housing constituted by a first member and a second member that have different linear expansion coefficients from each other, a busbar fixed to the first member being in contact with a heat dissipation member adhered to one surface of the second member; and a plurality of connection members that are provided in a vicinity of the heat dissipation member and connect the one surface of the second member and an opposing surface of the first member facing the one surface.

Advantageous Effects

According to the present disclosure, it is possible to provide an electrical junction box capable of quickly and appropriately dissipating heat generated by circuit components with a simpler configuration.

DETAILED DESCRIPTION OF PREFERRED EMBODIMENTS

Figure 1:
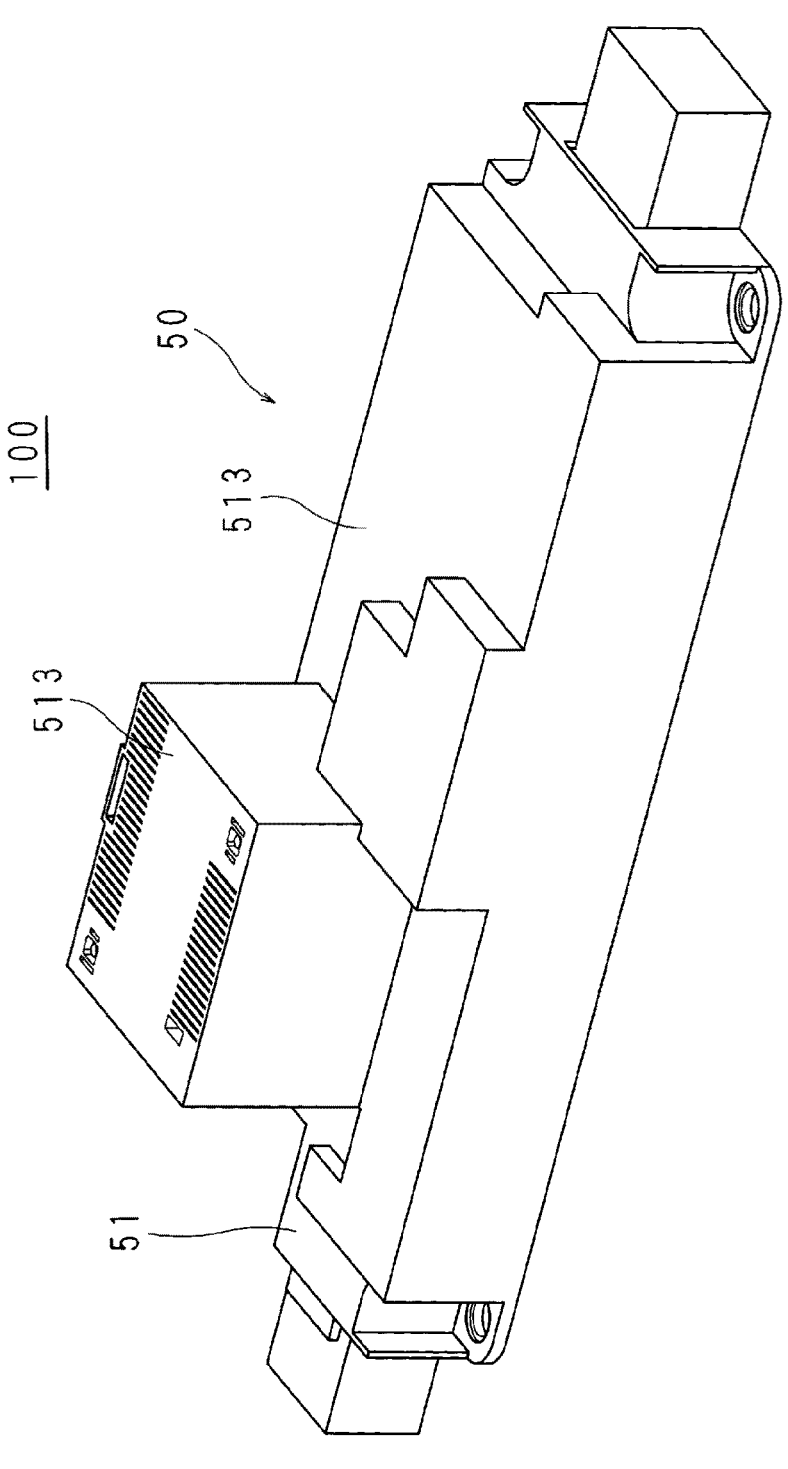
FIG. 1 is a perspective view showing an electrical junction box according to Embodiment 1.

First, embodiments of the present disclosure will be listed and described below. Also, at least parts of the embodiments described below may also be freely combined.

The electrical junction box according to an embodiment of the present disclosure is an electrical junction box including: a housing constituted by a first member and a second member that have different linear expansion coefficients from each other, a busbar fixed to the first member being in contact with a heat dissipation member adhered to one surface of the second member; and a plurality of connection members that are provided in a vicinity of the heat dissipation member and connect the one surface of the second member and an opposing surface of the first member facing the one surface.

In this embodiment, a plurality of the connection members are provided in the vicinity of the heat dissipation member, and connect the one surface of the second member and the opposing surface of the first member. Therefore, one of the first member and the second member that has a higher linear expansion coefficient functions to increase thermal expansion of the other of the first member and the second member, and the other having a lower linear expansion coefficient functions to suppress thermal expansion of the one. Thus, the difference between the amounts of thermal expansion of the first member and the second member is reduced, and the difference between the amounts of thermal expansion thereof can prevent the busbar and the heat dissipation member from separating from each other.

In the electrical junction box according to an embodiment of the present disclosure, the connection members extend in a direction in which the one surface and the opposing surface face each other, and are provided to surround the heat dissipation member.

In this embodiment, a plurality of the connection members are provided in the vicinity of the heat dissipation member to surround the heat dissipation member. Thus, it is possible to intensively reduce the difference between the amounts of thermal expansion of the first member and the second member in the vicinity of the heat dissipation member including the heat dissipation member.

In the electrical junction box according to an embodiment of the present disclosure, the first member has a higher linear expansion coefficient than the second member, the connection members each include a first portion provided on the opposing surface and a second portion provided on the one surface, and the first portion has higher elasticity than the second portion.

In this embodiment, in the connection member, the first portion provided in the first member having a higher linear expansion coefficient than the second member has higher elasticity than the second portion provided in the second member. Therefore, the first portion can bend in response to the large thermal expansion of the first member and return to its original shape.

In the electrical junction box according to an embodiment of the present disclosure, the length of the first portion in the opposing direction is longer than the length of the second portion.

In this embodiment, the length of the first portion in the opposing direction is longer than that of the second portion. Thus, the first portion is likely to bend in response to large thermal expansion of the first member.

In the electrical junction box according to an embodiment of the present disclosure, the first portion and the second portion are engaged with each other.

In this embodiment, the first portion and the second portion are formed as a single body through engagement between the first portion and the second portion. Thus, the first portion and the second portion can be easily assembled.

In the electrical junction box according to an embodiment of the present disclosure, the first portion is screwed to the second portion.

In this embodiment, the first portion and the second portion are formed as a single body by screwing the first portion to the second portion. Therefore, the integrated state of the first portion and the second portion can be stably maintained.

The electrical junction box according to an embodiment of the present disclosure will be described below with reference to the drawings. Note that the present disclosure is not limited to these examples, and is defined by the claims, and all changes that come within the meaning and range of equivalency of the claims are intended to be embraced therein.

Hereinafter, this embodiment will be described using, as an example, an electrical junction box that is to be mounted in a vehicle and accommodates, for example a relay as a circuit component.

Embodiment 1

FIG. 1 is a perspective view showing an electrical junction box 100 according to Embodiment 1. The electrical junction box 100 includes an accommodation housing 50 that accommodates circuit components. The accommodation housing 50 is made of a metal or resin, for example, and accommodates a relay 10, which will be described later.

The accommodation housing 50 is constituted by an upper case 51 (first member) to which the relay 10 is fixed, and a later-described lower case 52 (second member) covered by the upper case 51. In the electrical junction box 100, for example, a later-described bottom plate 521 of the lower case 52 is attached to the outside of a battery pack (not shown) of an EV (Electric Vehicle) such that the bottom plate 521 faces the battery pack. A cooling mechanism (not shown) is provided outside the battery pack.

Figure 2:
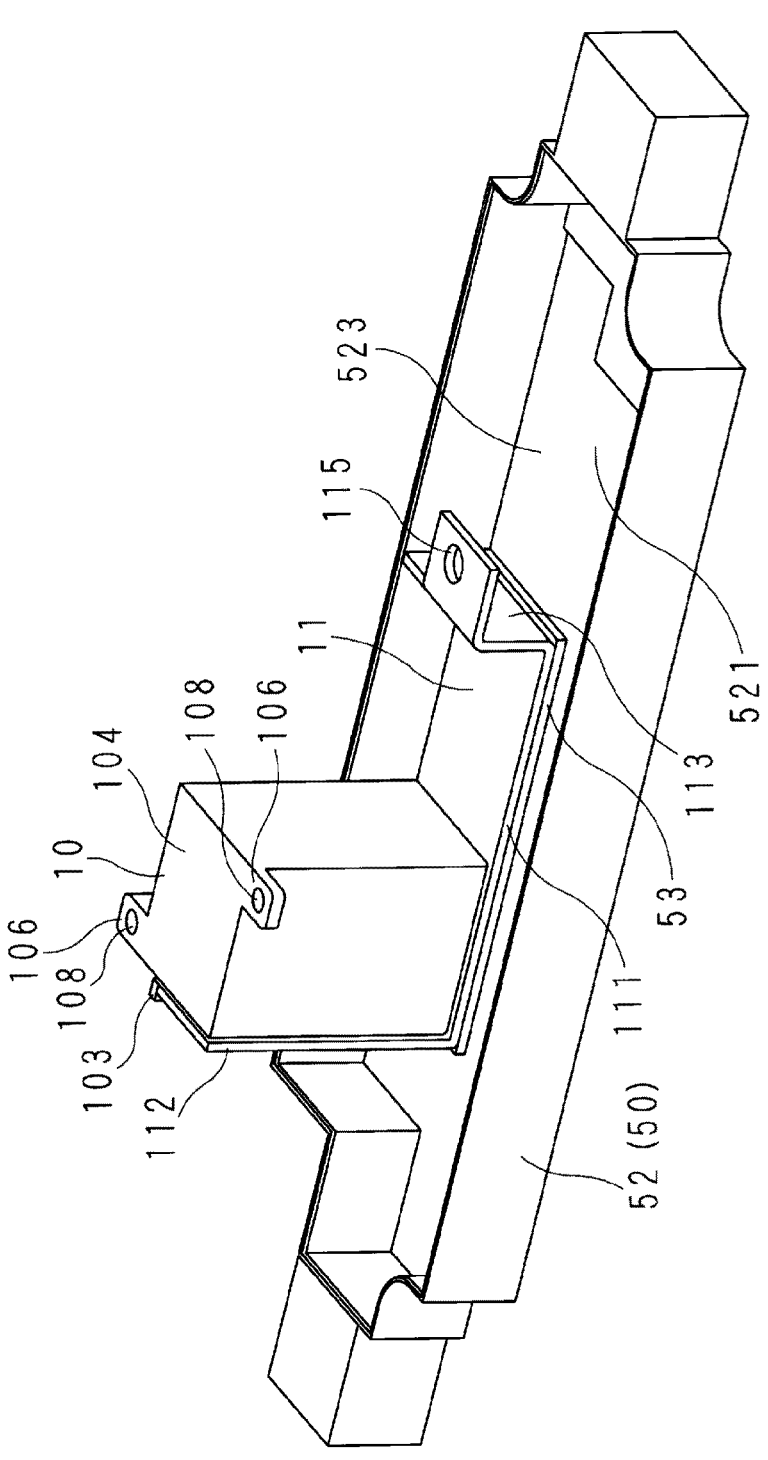
FIG. 2 is a perspective view showing a state in which an upper case is removed from the electrical junction box according to Embodiment 1.
Figure 3:
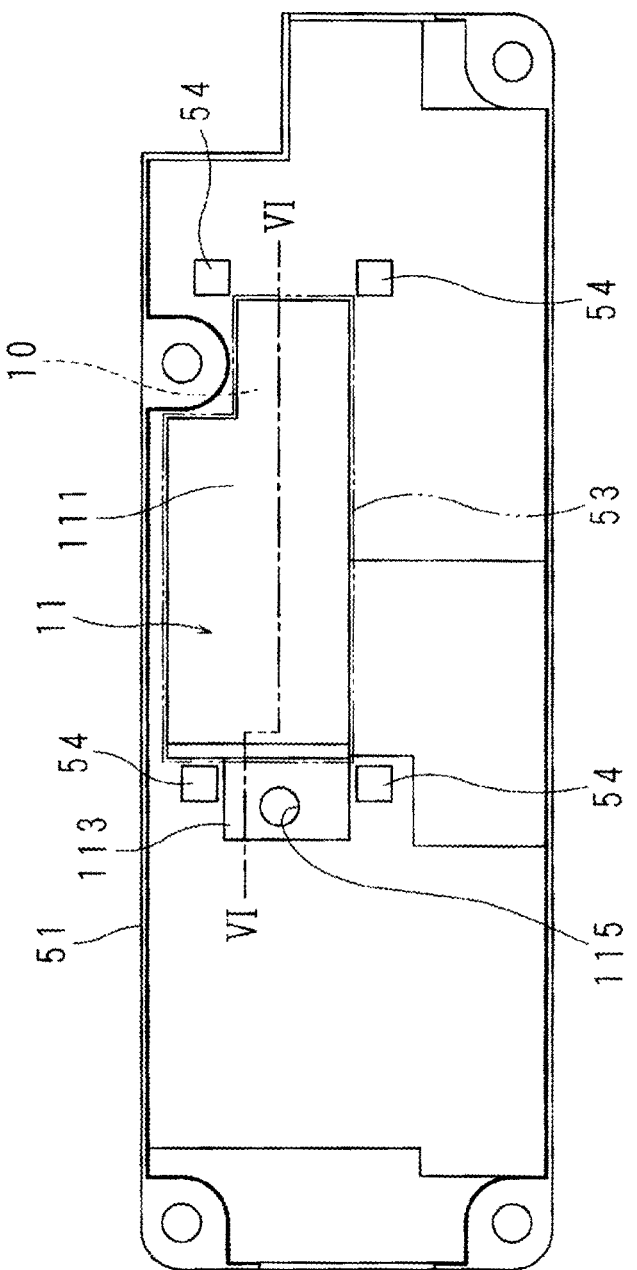
FIG. 3 is a bottom view showing the inside of an accommodation housing in a state in which a lower case is removed from the electrical junction box according to Embodiment 1.
Figure 4:
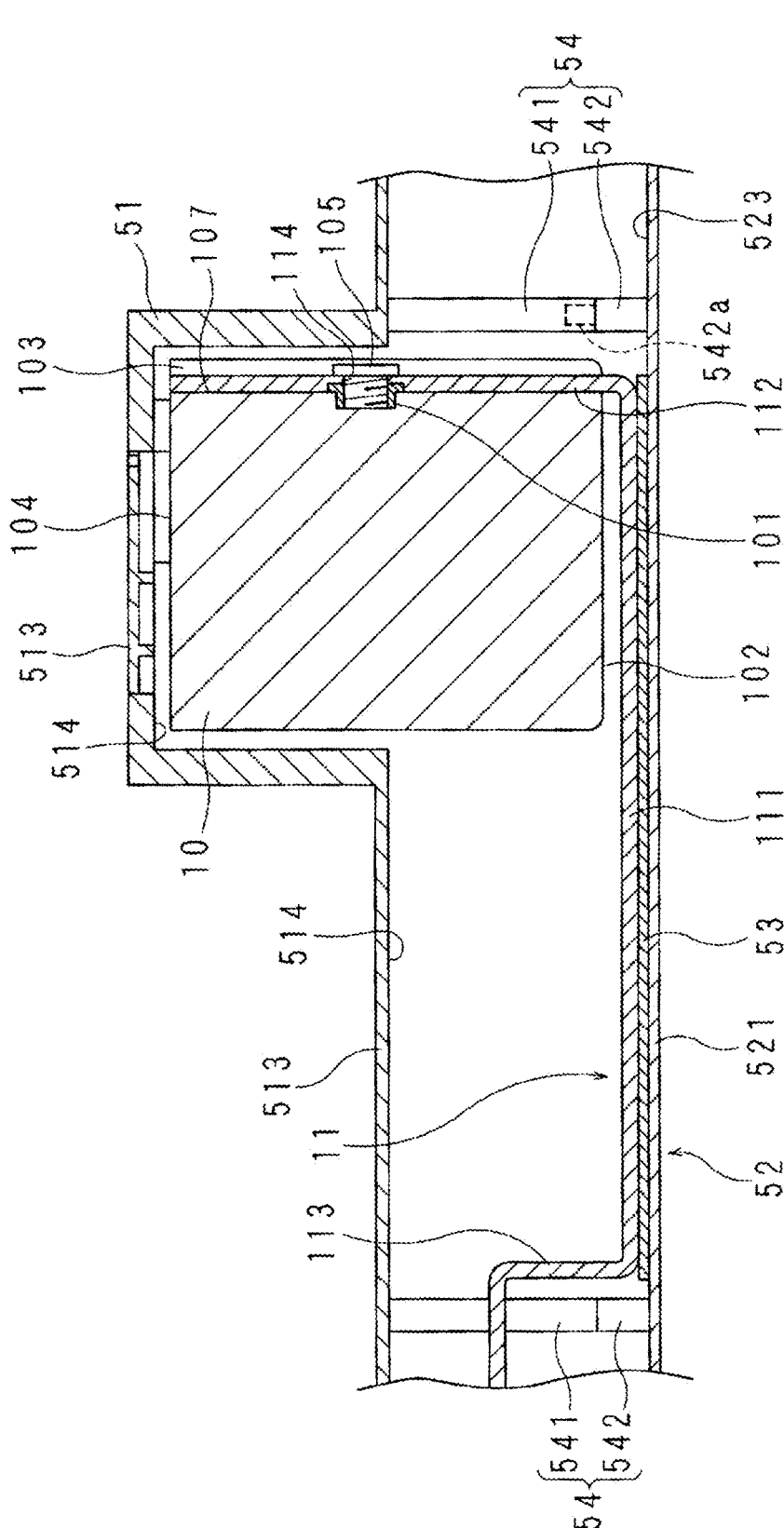
FIG. 4 is a partial cross-sectional view taken along line IV-IV in FIG. 3.

FIG. 2 is a perspective view showing a state in which the upper case 51 is removed from the electrical junction box 100 according to Embodiment 1, FIG. 3 is a bottom view showing the inside of the accommodation housing 50 in a state in which the lower case 52 is removed from the electrical junction box 100 according to Embodiment 1, and FIG. 4 is a partial cross-sectional view taken along line IV-IV in FIG. 3. For convenience, a later-described gap filler 53 is indicated using line-double dash lines in FIG. 3.

The upper case 51 and the lower case 52 have different linear expansion coefficients from each other. The upper case 51 is made of an ordinary resin, and the lower case 52 is made of a so-called heat dissipation resin that has higher thermal conductivity than the upper case 51. That is, the upper case 51 stores heat more easily than the lower case 52 and expands more than the lower case 52 when heat is generated.

As will be described later, the relay 10 is fixed to a ceiling plate 513 of the upper case 51. A busbar 11 is provided in the vicinity of an inner surface 523 (one surface) of the bottom plate 521 of the lower case 52 that faces the inner surface 514 (opposing surface) of the ceiling plate 513. A portion of the busbar 11 is interposed between the relay 10 and the inner surface 523.

The relay 10 is, for example, switched to the ON state when a vehicle is running, and is switched to the OFF state when the vehicle is not running. The relay 10 has a rectangular cuboid box shape, and is provided such that one surface 102 of the relay 10 faces the inner surface 523 (busbar 11) of the bottom plate 521.

The relay 10 has four side surfaces that respectively and perpendicularly extend upward from four side edges of the one surface 102, and as will be described later, one side surface 107 out of the four side surfaces is provided with a terminal 101. That is, the relay 10 is provided such that the one surface 102 faces the inner surface 523, and the side surface 107 intersects with the inner surface 523.

The side surface 107 has a rectangular shape whose longitudinal direction is the direction in which the inner surface 514 of the ceiling plate 513 and the inner surface 523 of the bottom plate 521 face each other (referred to as a "vertical direction" hereinafter). The side surface 107 is provided with two terminals 101. The two terminals 101 are arranged side-by-side in a direction (referred to as a "horizontal direction" hereinafter) intersecting with the vertical direction. One of the two terminals 101 is connected to the busbar 11. FIG. 4 shows only one terminal 101.

Each terminal 101 has a cylindrical shape, and most of the terminal 101 is embedded in the relay 10, and one end portion of the terminal 101 is exposed on the side surface 107. A thread is formed on an inner peripheral surface of the terminal 101, and a bolt 105 is screwed into the terminal 101 (see FIG. 4).

Also, a partition plate 103 protruding from the side surface 107 is provided between the two terminals 101 on the side surface 107 of the relay 10. The two terminals 101 are separated by the partition plate 103. The partition plate 103 has a substantially rectangular shape and extends in the vertical direction.

In the relay 10, two connection pieces 106 are provided on another surface 104 opposite to the one surface 102 (see FIG. 2). The connection pieces 106 are respectively connected to two opposing edges of the other surface 104. The two connection pieces 106 are provided diagonally to each other, and extend from the corresponding edges of the other surface 104 along the plane direction of the other surface 104. Through holes 108 are formed in the connection pieces 106 and extend through the connection pieces 106 in the vertical direction. The relay 10 is fixed to the upper case 51 by inserting bolts (not shown) into the through holes 108 and screwing the bolts into screw holes provided in the inner surface 514 of the upper case 51, for example.

The busbar 11 is constituted by a metal plate with good conductivity for example. The busbar 11 has a flat portion 111 that faces the one surface 102 of the relay 10 and the inner surface 523 of the bottom plate 521. Also, a contact portion 112 and a fixing portion 113, which extend in the vertical direction, are respectively connected to two opposing side edges of the flat portion 111.

The contact portion 112 has a rectangular plate shape whose longitudinal direction is the vertical direction, and is arranged in the vicinity of the side surface 107 of the relay 10. The contact portion 112 extends along the side surface 107 and has a through hole 114 at approximately a center portion thereof. By inserting a bolt 105 into a through hole 114 and screwing the bolt 105 into one terminal 101, the contact portion 112 (busbar 11) is fixed and electrically connected to one terminal 101.

An end portion of the fixing portion 113 is bent parallel to the bottom plate 521, and a through hole 115 (see FIG. 2) is formed in this end portion. The fixing portion 113 is fixed to the upper case 51 using the through hole 115. Because the busbar 11 is fixed to the upper case 51 in this manner, it is possible to improve assembly workability.

The gap filler 53 (heat dissipation member) that transmits heat generated by the relay 10 to the lower case 52 side via the busbar 11 is adhered to the bottom plate 521 of the lower case 52. The gap filler 53 has higher thermal conductivity than the lower case 52. The gap filler 53 is adhered in a range corresponding to the flat portion 111 of the busbar 11 in the vertical direction. The gap filler 53 has a rectangular shape whose one corner is cut out (see FIG. 3), for example.

Also, the gap filler 53 has insulating properties. The gap filler 53 is a coating type gap filler, and will be hardened over time. That is, the gap filler 53 is semi-solid when the gap filler 53 is being applied, but will be hardened after the gap filler 53 is applied. The hardened gap filler 53 has a plate shape.

The gap filler 53 is interposed between the busbar 11 and the inner surface 523 of the bottom plate 521 (see FIG. 2). That is, both main surfaces of the gap filler 53 are pressed against and in contact with the flat portion 111 of the busbar 11 and the inner surface 523 of the bottom plate 521. The hardened gap filler 53 is bonded to the flat portion 111 and the inner surface 523.

A plurality of connection members 54 that connect the ceiling plate 513 (inner surface 514) and the bottom plate 521 (inner surface 523) are provided in the accommodation housing 50. As shown in FIG. 3, the plurality of connection members 54 are provided in the vicinity of the gap filler 53. Specifically, the plurality of connection members 54 are provided near corners of the gap filler 53 to surround the gap filler 53. For example, Example 1 will be described using an example in which four connection members 54 are provided, but the number of connection members 54 is not limited to this, and may be three, or five or more.

Each connection member 54 has, for example, a square bar shape, and extends in a direction in which the inner surface 523 of the bottom plate 521 and the inner surface 514 of the ceiling plate 513 face each other, that is, in the vertical direction.

Also, each connection member 54 is divided into two portions, namely a first portion 541 and a second portion 542, in the vertical direction. The first portion 541 is provided on the inner surface 514 of the ceiling plate 513, and the second portion 542 is provided on the inner surface 523 of the bottom plate 521. For example, the first portion 541 is formed as a single body with the ceiling plate 513, and the second portion 542 is formed as a single body with the bottom plate 521.

That is, the first portion 541 and the second portion 542 are made of different materials, and the first portion 541 has higher elasticity than the second portion 542. That is, the first portion 541 is more likely to bend, compared to the second portion 542. Also, the length of the first portion 541 is longer than the length of the second portion 542 in the vertical direction. Therefore, the first portion 541 is more likely to deform, compared to the second portion 542, and the deformed first portion 541 returns to its original shape.

As shown in FIG. 4, the first portion 541 and the second portion 542 are arranged on the same axis, and their leading ends abut against each other. An engagement protrusion 542a protrudes from the leading end portion of the second portion 542 in the axial direction (see the dashed line portion in FIG. 4), and a recess (not shown) that corresponds to the engagement protrusion 542a is formed at the leading end portion of the first portion 541. The first portion 541 and the second portion 542 are formed as a single body through engagement between the engagement protrusion 542a of the second portion 542 and the recess in the leading end portion of the first portion 541.

Incidentally heat is generated in circuit components such as the relay 10 during operation. Such heat has a negative effect on electrical components around the relay 10, and may cause an electrical component to malfunction, and thus heat needs to be dissipated. To address this, the electrical junction box 100 according to Embodiment 1 transmits heat generated by the relay 10 to the accommodation housing 50 (lower case 52) via the busbar 11 and the gap filler 53, and dissipates heat via the lower case 52. Further, in the electrical junction box 100, in order to enhance heat dissipation effects, a heat dissipation resin, which has higher thermal conductivity than an ordinary resin, is used as a material of the lower case 52. That is, the upper case 51 and the lower case 52 have different linear expansion coefficients from each other, and the linear expansion coefficient (the amount of thermal expansion) of the upper case 51 is larger than that of the lower case 52.

However, when the upper case 51 and the lower case 52 have different linear expansion coefficients from each other and the busbar 11 is fixed to the upper case 51 in this manner, the upper case 51 and the busbar 11 fixed to the upper case 51 also expand due to heat generated by the relay 10, for example.

In contrast, the gap filler 53 adhered to the lower case 52 expands in response to expansion of the lower case 52. Specifically, the difference between the linear expansion coefficients of the upper case 51 and the lower case 52 appears as the difference between the amounts of thermal expansion of the busbar 11 fixed to the upper case 51 and the gap filler 53 adhered to the lower case 52. As a result, when the difference between the amounts of thermal expansion of the busbar 11 and the gap filler 53 is large, the busbar 11 may be separated from the gap filler 53. In this case, a problem arises that heat generated by the relay 10 cannot be appropriately transmitted to the lower case 52. Such a problem may also arise when the upper case 51 (busbar 11) and the lower case 52 (gap filler 53) contract.

However, the electrical junction box 100 according to Embodiment 1 having the above configuration can prevent such a problem in advance. Details will be described below.

As described above, in the electrical junction box 100 according to Embodiment 1, a plurality of connection members 54 are provided to surround the gap filler 53, and the upper case 51 (ceiling plate 513) and the lower case 52 (bottom plate 521) are connected to each other by the connection members 54. As a result, the upper case 51 and the lower case 52 mutually suppress expansion.

For example, when the upper case 51 expands, such expansion widens the distance between connection members 54, and thus the expansion of the upper case 51 is transmitted to the lower case 52 via the connection members 54 and expands a region of the lower case 52 including the gap filler 53. However, as described above, the lower case 52 has a smaller amount of thermal expansion than the upper case 51 and does not expand as much as the upper case 51, which prevents an increase in the distance between connection members 54. Such a prevention effect is also transmitted to the upper case 51 via the connection members 54, and acts as a force to suppress the expansion of the upper case 51. The difference between the amounts of thermal expansion of the upper case 51 and the lower case 52 is reduced through such s process.

Thus, a problem that the busbar 11 is separated from the gap filler 53 and heat generated by the relay 10 cannot be appropriately transmitted to the lower case 52 is prevented in advance.

Also, as described above, in the electrical junction box 100 according to Embodiment 1, a plurality of connection members 54 are provided to surround the gap filler 53. That is, because the connection members 54 are provided only around the gap filler 53, which causes a problem, the configuration of the electrical junction box 100 can be simplified.

Further, as described above, in the electrical junction box 100 according to Embodiment 1, the first portion 541 provided in the upper case 51 having a large amount of thermal expansion has higher elasticity than the second portion 542 provided in the lower case 52 having a small amount of thermal expansion. Therefore, the connection members 54 can withstand severe expansion of the upper case 51 and return to their original shapes.

Further, as described above, in the electrical junction box 100 according to Embodiment 1, the first portion 541 provided in the upper case 51 is longer than the second portion 542 provided in the lower case 52 in length in the vertical direction. Therefore, the first portion 541 can be easily deformed in response to the expansion of the upper case 51 having a large amount of thermal expansion.

Further, as described above, in the electrical junction box 100 according to Embodiment 1, each connection member 54 is constituted by the first portion 541 and the second portion 542, and is formed as a single body through engagement between the first portion 541 and the second portion 542. Thus, during the process of combining the upper case 51 and the lower case 52, the first portion 541 and the second portion 542 are also engaged with each other, thus improving workability.

Although the electrical junction box 100 according to Embodiment 1 has been described using an example in which the connection members 54 have a square bar shape, the present disclosure is not limited to this. For example, the connection members 54 may have a round bar shape.

Although an example has been described above in which each connection member 54 is separated into two portions, namely, the first portion 541 and the second portion 542, the present disclosure is not limited to this, and the connection member 54 need not be separated and may be a single member.

Although an example has been described above in which the first portion 541 on the upper case 51 side and the second portion 542 on the lower case 52 side are made of different materials and the first portion 541 has high elasticity than the second portion 542, the present disclosure is not limited to this. A configuration may be adopted in which the second portion 542 has higher elasticity than the first portion 541.

Although an example has been described above in which the engagement protrusion 542a protrudes from the leading end portion of the second portion 542 and the recess corresponding to the engagement protrusion 542a is formed in the leading end portion of the first portion 541 and the first portion 541 and the second portion 542 are formed as a single body through engagement between the engagement protrusion 542a of the second portion 542 and the recess of the first portion 541, the present disclosure is not limited to this. A configuration may be adopted in which an engagement protrusion protrudes from a leading end portion of the first portion 541 and a recess corresponding to the engagement protrusion is formed in a leading end portion of the second portion 542.

Note that, although an example has been described above in which the upper case 51 has a higher linear expansion coefficient than the lower case 52, the present disclosure is not limited to this. It goes without saying that the present disclosure is applicable even when the lower case 52 has a higher linear expansion coefficient than the upper case 51.

Embodiment 2

Figure 5:
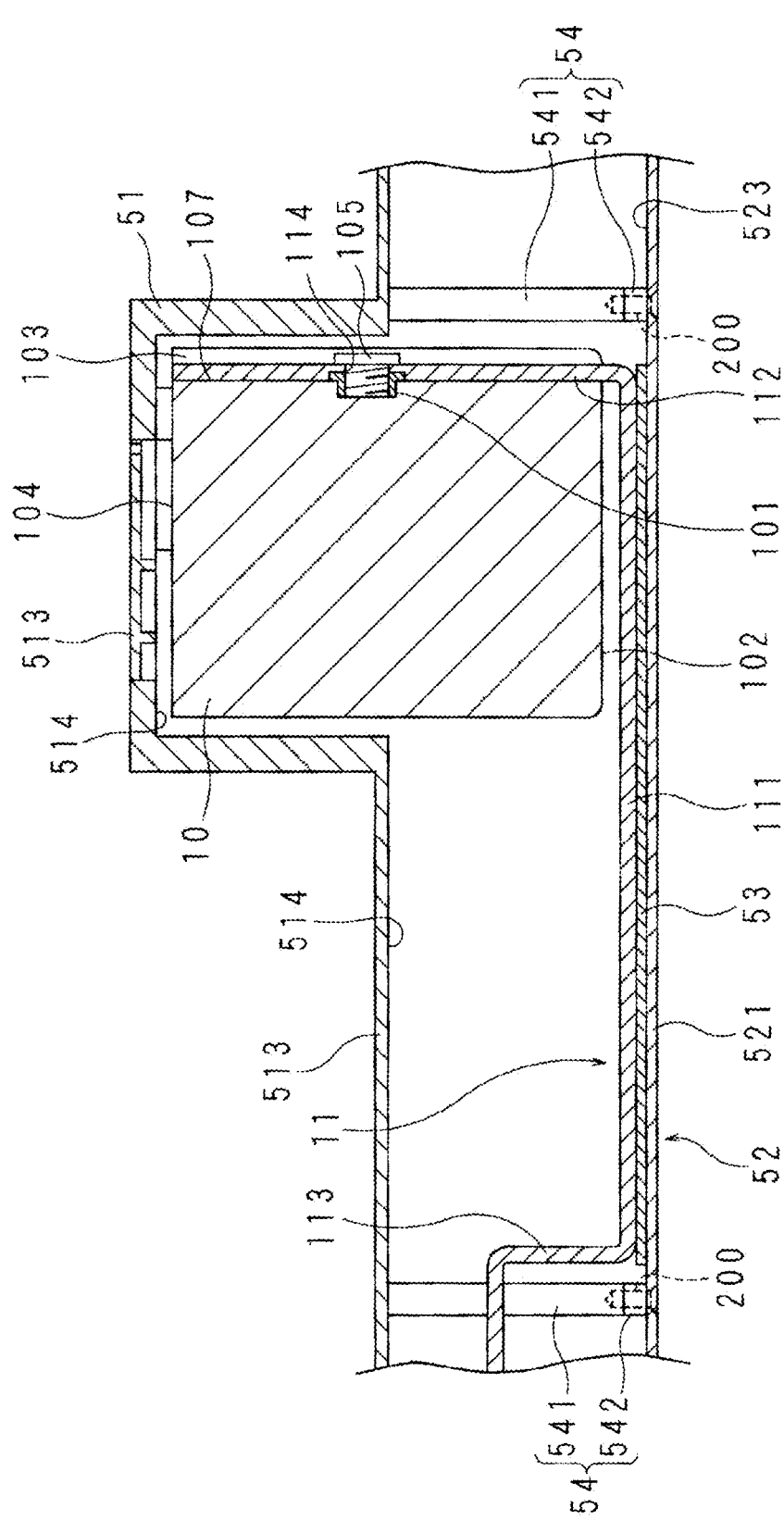
FIG. 5 is a partial longitudinal cross-sectional view of an electrical junction box according to Embodiment 2.

FIG. 5 is a partial longitudinal cross-sectional view of an electrical junction box 100 according to Embodiment 2.

Like the electrical junction box 100 according to Embodiment 1, in the electrical junction box 100 according to Embodiment 2, an accommodation housing 50 is constituted by an upper case 51 and a lower case 52 that have different linear expansion coefficients from each other, the busbar 11 connected to the relay 10 is fixed to the upper case 51 and is in contact with the gap filler 53 adhered to the lower case 52.

Also, a plurality of connection members 54 are provided to surround the gap filler 53, and each connection member 54 is constituted by a first portion 541 and a second portion 542. The first portion 541 is provided in the upper case 51 (ceiling plate 513), and the second portion 542 is provided in the lower case 52 (bottom plate 521). The first portion 541 has higher elasticity than the second portion 542.

The first portion 541 is longer than the second portion 542 in length in the vertical direction. The first portion 541 according to Embodiment 2 is longer than in Embodiment 1, and the second portion 542 according to Embodiment 2 is shorter than that in Embodiment 1.

As shown in FIG. 5, the first portion 541 and the second portion 542 are arranged on the same axis, and their leading ends abut against each other. The second portion 542 has a cylindrical shape, and a through hole (not shown) communicating with the inside of the second portion 542 is formed in the bottom plate 521 at a position aligned with the second portion 542. Also, a circular recess (not shown) is provided at a leading end portion of the first portion 541, and a thread is formed on an inner peripheral surface of this recess. As shown in FIG. 5, the first portion 541 and the second portion 542 are formed as a single body (integrated) by inserting a screw 200 into the second portion 542 from an outer surface of the bottom plate 521 through the through hole and screwing the screw 200 into the recess of the first portion 541.

The integrated state of the first portion 541 and the second portion 542 is stably maintained by screwing the second portion 542 to the first portion 541.

Technical features (constituent features) described in Embodiments 1 and 2 can be combined with each other, and new technical features can be formed by combining them.

The embodiments disclosed in this application are to be considered in all respects as illustrative and not restrictive. The scope of the present disclosure is indicated by the scope of the claims rather than by the meaning of the above description, and all changes that come within the meaning and range of equivalency of the claims are intended to be embraced therein.

The invention claimed is:

1. An electrical junction box comprising:
a housing constituted by a first member having an inner surface and a second member having an inner surface facing the inner surface of the first member, the first member spaced apart from the second member and the first member and the second member have different linear expansion coefficients from each other, a busbar fixed to the first member being in contact with a heat dissipation member adhered to the inner surface of the second member; and
a plurality of connection members that are disposed entirely within the housing and in a vicinity of the heat dissipation member and connect the inner surface of the second member to the inner surface of the first member.

2. The electrical junction box according to claim 1, wherein the connection members extend in a direction in which the inner surfaces of the first member and the second member face each other, and are provided to surround the heat dissipation member.

3. The electrical junction box according to claim 2, wherein the first member has a higher linear expansion coefficient than the second member,
the connection members each include a first portion provided on the inner surface of the first member, and a second portion provided on the inner surface of the second member, and
the first portion has higher elasticity than the second portion.

4. The electrical junction box according to claim 3, wherein the length of the first portion in the opposing direction is longer than the length of the second portion.

5. The electrical junction box according to claim 4, wherein the first portion and the second portion are engaged with each other.

6. The electrical junction box according to claim 4, wherein the first portion is screwed to the second portion.

7. The electrical junction box according to claim 3, wherein the first portion and the second portion are engaged with each other.

8. The electrical junction box according to claim 3, wherein the first portion is screwed to the second portion.

* * * * *